United States Patent [19]

Murai

[11] Patent Number: 5,521,921
[45] Date of Patent: May 28, 1996

[54] DATA COMMUNICATIONS METHOD AND APPARATUS

[75] Inventor: Masao Murai, Tokyo, Japan

[73] Assignee: NEC Corporation, Tokyo, Japan

[21] Appl. No.: 404,271

[22] Filed: Mar. 14, 1995

[30] Foreign Application Priority Data

Mar. 15, 1994 [JP] Japan .................. 6-043422

[51] Int. Cl.⁶ .................. H04J 15/00; H04J 3/16
[52] U.S. Cl. .................. 370/82.000; 370/94.2; 370/99; 370/110.1
[58] Field of Search .................. 370/79, 82, 942, 370/110.1, 81, 60, 91, 94.1, 94.3, 99, 112

[56] References Cited

U.S. PATENT DOCUMENTS

| | | | |
|---|---|---|---|
| 4,312,065 | 1/1982 | Ulug | 370/85.1 |
| 4,317,197 | 2/1982 | Ulug | 370/94.3 |
| 4,334,306 | 6/1982 | Ulug | 370/94.3 |
| 4,512,016 | 4/1985 | Fulcomer, Jr. et al. | 370/110.1 |
| 5,229,992 | 7/1993 | Jurkevich et al. | 370/94.1 |
| 5,392,280 | 2/1995 | Zheng | 370/94.2 |
| 5,412,660 | 5/1995 | Chen et al. | 370/110.1 |
| 5,461,618 | 10/1995 | Chen et al. | 370/110.1 |

FOREIGN PATENT DOCUMENTS 58-173943  4/1982  Japan .

Primary Examiner—Hassan Kizou
Assistant Examiner—Seema S. Rao
Attorney, Agent, or Firm—Sughrue, Mion, Zinn, Macpeak & Seas

[57] ABSTRACT

Voice data are enclosed between a header code and tail code to form a voice frame which is interposed into an ordinary HDLC frame for transmission as a composite frame. The header code is a code that does not occur in an ordinary HDLC frame and can therefore be reliably detected on the receiving side. During transmission of voice data, the clocks on the HDLC transmitting and receiving sides are stopped, thereby temporarily halting HDLC transmission.

8 Claims, 15 Drawing Sheets

FIG. 2A
PRIOR ART
HDLC FRAME 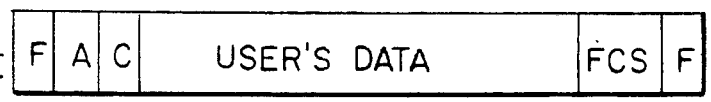
FIG. 2B
PRIOR ART
VOICE DATA FRAME 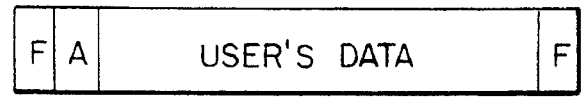
HDLC FRAME 1  
COMPOSITE FRAME 2 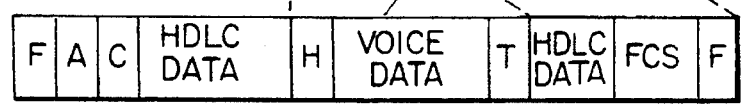
HDLC CLOCK 4 — ON — OFF — ON
VOICE FRAME TRANSMITTING OR RECEIVING SIGNAL 5 — OFF — ON — OFF
FIG. 4B
HDLC FRAME 1 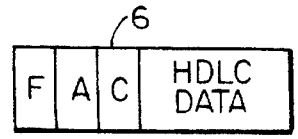 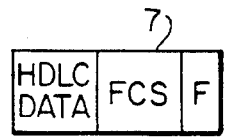
VOICE FRAME 3 

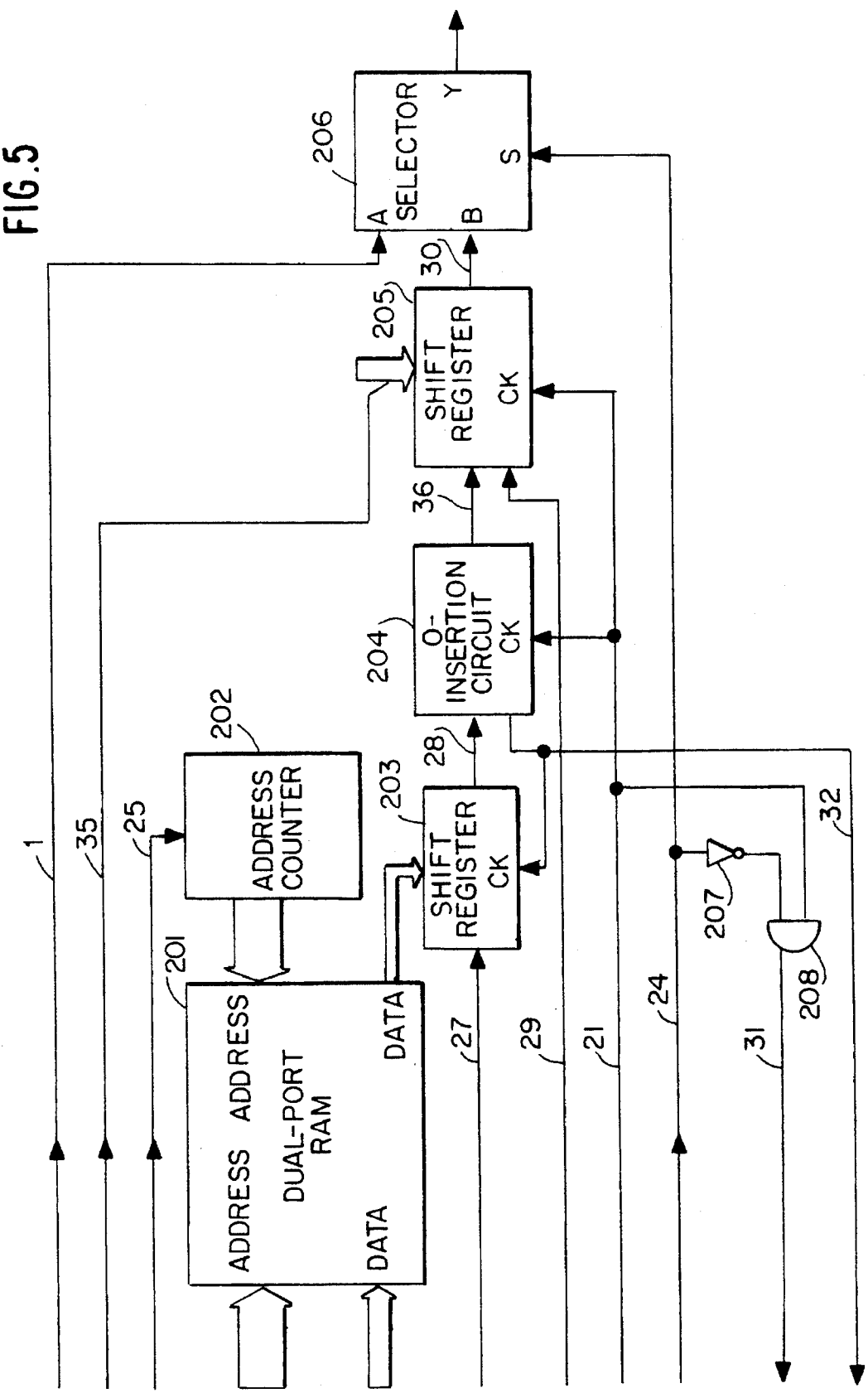

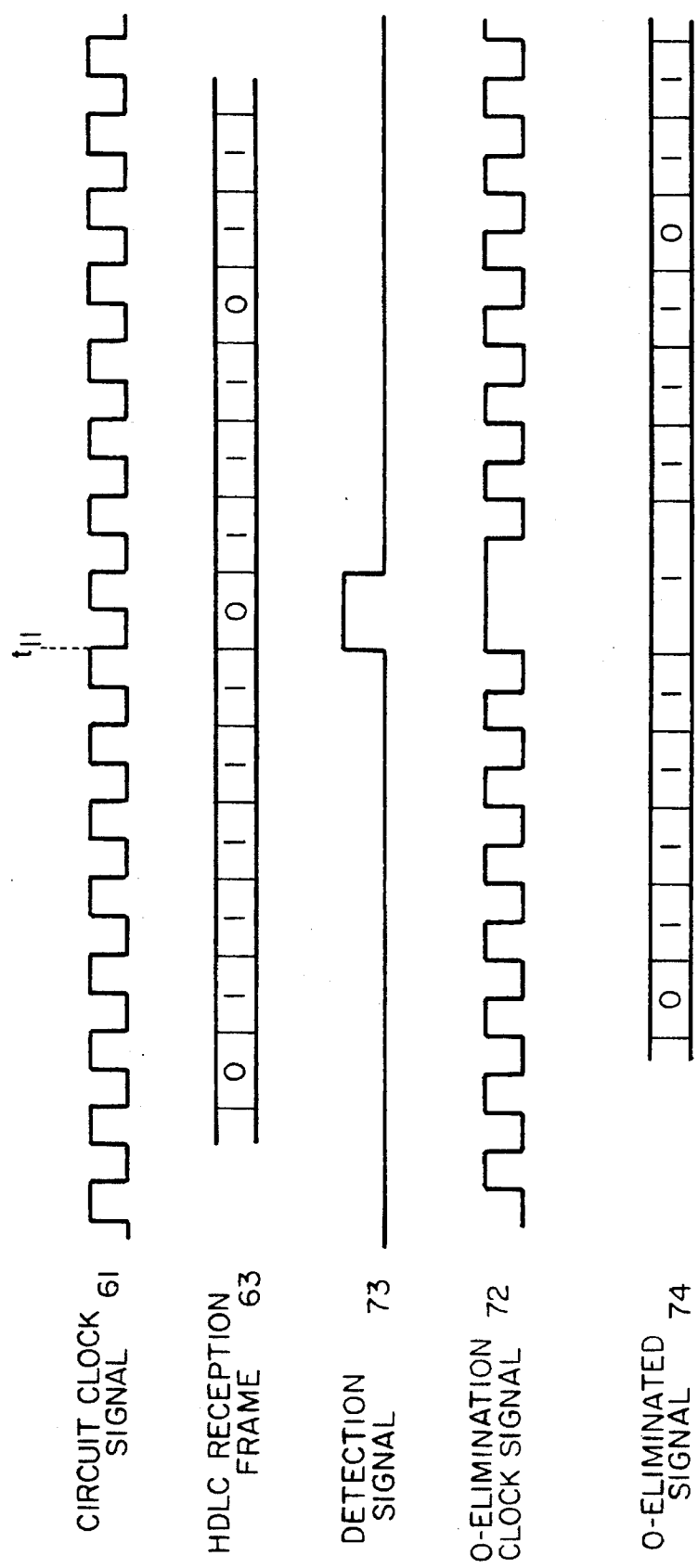

DATA COMMUNICATIONS METHOD AND APPARATUS

BACKGROUND OF THE INVENTION

1. Field of the Invention

The present invention relates to a data communications method and apparatus, and particularly to a data communications method and apparatus for transmission and reception of voice data and ordinary data for high-level data link control (HDLC).

2. Description of the Related Art

As shown in FIG. 1, a conventional example of data communications apparatus of this type consists of, on the transmission side, a data analyzer 800 that separates HDLC data and voice data, a frame generator 810 and an FCS adder 830 that generate frames from the HDLC data, a voice frame generator 820 that generates frames from voice data, and a frame transmitter 840 that transmits both types of frames to a transit trunk 890; and on the reception side, a frame detector 850 that receives frames, a frame analyzer 860 that separates the received frames into voice frames and HDLC frames, a voice data frame extractor 870 that extracts data from voice frames, and an HDLC frame check circuit 880 that extracts data from HDLC frames (for example, as disclosed in Japanese Patent Laid-open No. 173943/83).

Next will be explained the operation of this prior art example.

In contrast to general HDLC data, voice data do not need to be repeated when transmitting voice data between packet exchanges that transmit data according to high-level procedures (HDLC), and error check blocks FCS(Frame Check Sequence) are therefore not necessary. Here, as shown in FIG. 2, in contrast to general HDLC frames that are composed of flag pattern F, address part A, control information part C, a data part (user's data), error check block FCS, voice frames are made up of flag pattern F, address part A', a data part (user's data).

As shown in FIG. 1, when transmitting HDLC frames mixed with voice frames, the data to be transmitted is separated on the transmitting side into HDLC data and voice data at data analyzer 800, frames are generated from the voice data at voice frame generator 820, frames are generated from the HDLC data at HDLC frame generator 810, FCS code is added at FCS adder 830, and voice frames or HDLC frames are sequentially transmitted from frame transmitter 840.

On the reception side, address A or A' of the received frames is analyzed at frame analyzer 860 and separated into voice frames and HDLC frames, and voice data are extracted from the voice frames at voice data frame extractor 870. HDLC frames are checked at HDLC frame check circuit 880 and after processing by protocol such as repeating, data are extracted.

In such a conventional data communications apparatus, because voice data are also transmitted as packets, transmission of voice data in response to a generated request must wait until completion of transmission of an HDLC frame being transmitted. In particular, there is the problem that a long portion of HDLC user data will involve a lengthy transmission time for the HDLC frame, thereby resulting in a lengthy waiting time for transmission of a voice frame.

SUMMARY OF THE INVENTION

The object of the present invention is to provide a data communications method and apparatus in which a waiting time does not occur when transmitting a voice frame.

According to one aspect of the present invention, there is provided with a data communications method comprising steps of; inserting voice data between a header code and tail code that do not occur in ordinary HDLC data; interposing the frame including the voice data and header and tail codes into an ordinary HDLC frame; transmitting both frames as a composite frame; extracting data inserted between the header code and tail code as voice data; and stopping transmitting side and receiving side clocks of the HDLC data during transmission of voice data.

According to another aspect of the present invention, there is provided with a data communication apparatus comprising, on the transmitting side, means for converting voice data to serial data, means for adding a header code that does not appear in ordinary HDLC data before the serial-converted voice data and adding a tail code after the serial voice data, means for transmitting while switching between HDLC data and voice data to which a header code and tail code are added, and means for stopping HDLC data transmission during the transmission of voice data; and on the receiving side, means for detecting the header code and the tail code, means for taking in data inserted between the header code and tail code as voice data, and means for stopping HDLC data reception from the start of detection of a header code until completion of detection of a tail code.

The above and other objects, features, and advantages of the present invention will become more apparent from the following description of the preferred embodiment in conjunction with the accompanying drawings.

BRIEF DESCRIPTION OF THE DRAWINGS

FIGS. 2A and 2B are views showing the construction of frames of the data communications apparatus shown in FIG. 1;

FIGS. 4A and 4B are views showing the structure of signal frames;

FIG. 5 is a circuit diagram of the voice frame transmitter 200 shown in FIG. 3;

FIG. 16 is a timing chart of the 0-elimination circuit 603 shown in FIG. 15.

DETAILED DESCRIPTION OF THE PREFERRED EMBODIMENTS

Figure 3:
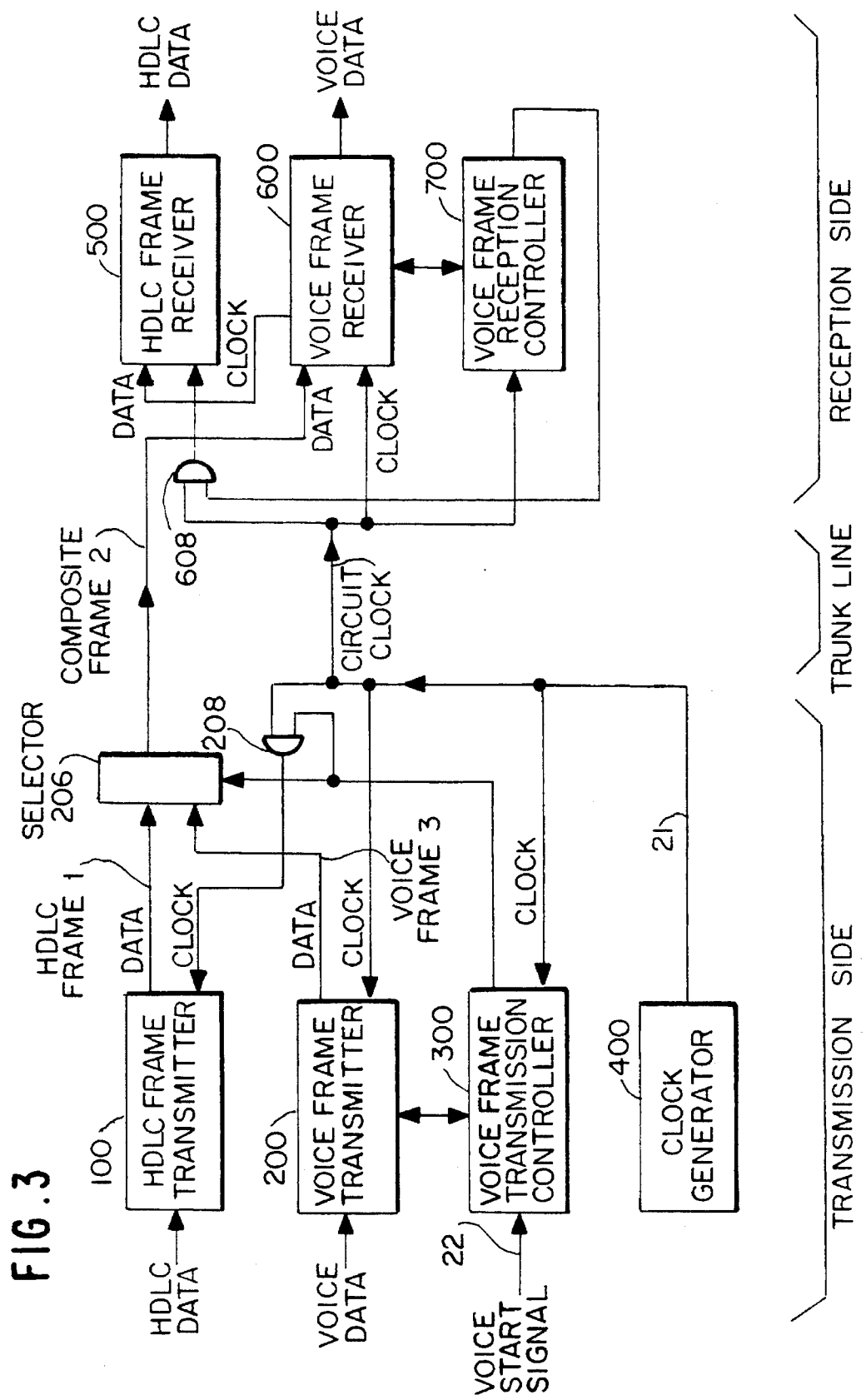
FIG. 3 is a view in a block form showing the construction of a data communications apparatus according to one embodiment of the present invention.

Referring to FIG. 3, an embodiment of the voice data communications apparatus of the present invention comprises, on the transmitting side, HDLC frame transmitter 100 that sends HDLC data, voice frame transmitter 200 that sends voice data, voice frame transmission controller 300 that controls the voice frame transmitter 200, selector 206 that switches between HDLC frames 1 from HDLC frame transmitter 100 and voice frames 3 from voice frame transmitter 200 and outputs composite frames 2, clock generator 400 that generates circuit clock signal 21, and AND gate 208 that controls circuit clock signal 21.

On the receiving side, the apparatus comprises HDLC frame receiver 500 that receives composite frames 2, voice frame receiver 600, and voice frame reception controller 700 that analyzes received frames, distinguishes voice frames and HDLC frames, and controls the voice frame receiver 600, and AND gate 608 that controls circuit clock signal 21.

The transmitting side and receiving side are connected by a transit trunk, and composite frames 2 are relayed in synchronism with circuit clock signal 21.

Figure 4A:

Referring to FIG. 4a, HDLC frame 1 is made up of flag pattern F, address part A, control information part C, an HDLC data part, and error check block FCS. Voice frame 3 is made up of header code H, voice data, and tail code T.

Generally, to ensure that a transmission line transmits every digital signal, HDLC inserts one "0" bit following the transmission of five consecutive "1" bits of transmission data on the transmitting side. On the receiving side, one "0" bit received after receiving five consecutive "1" bits is eliminated. As an exception, there is flag pattern F "01111110" by which synchronism of the head of a frame is established.

In a voice frame as well, header code H is made "11111110" as an exception to HDLC to establish the synchronism of the head of a frame. As tail code T, the end of a voice frame is made "01111110", which is the same as flag pattern F.

Using the above-described frame structure, header code H will be a unique code that can be reliably detected wherever it occurs in an HDLC frame 1. Accordingly, composite frames 2 can be produced by enclosing voice data with header code H and tail code T to form a voice frame 3 and inserting it within an HDLC frame 1. Further, because header code H is a unique code as serial data, voice frame 3 can be interposed in bit units in any position within flag pattern F, address part A, control information part C, HDLC data part, or error check block FCS of HDLC frame 1.

On the receiving side, when header code H is detected, receiving voice data signal 5 becomes "1", and when tail code T is next detected, receiving voice data signal 5 becomes "0". By stopping the clock signals of HDLC frame receiver 500 while receiving voice data signal 5 is "1", HDLC frame receiver 500 can eliminate the voice frame, and the first half 6 and last half 7 of an HDLC frame analyzed separated by a voice frame 3 can be processed as a continuous entity.

Figure 6:
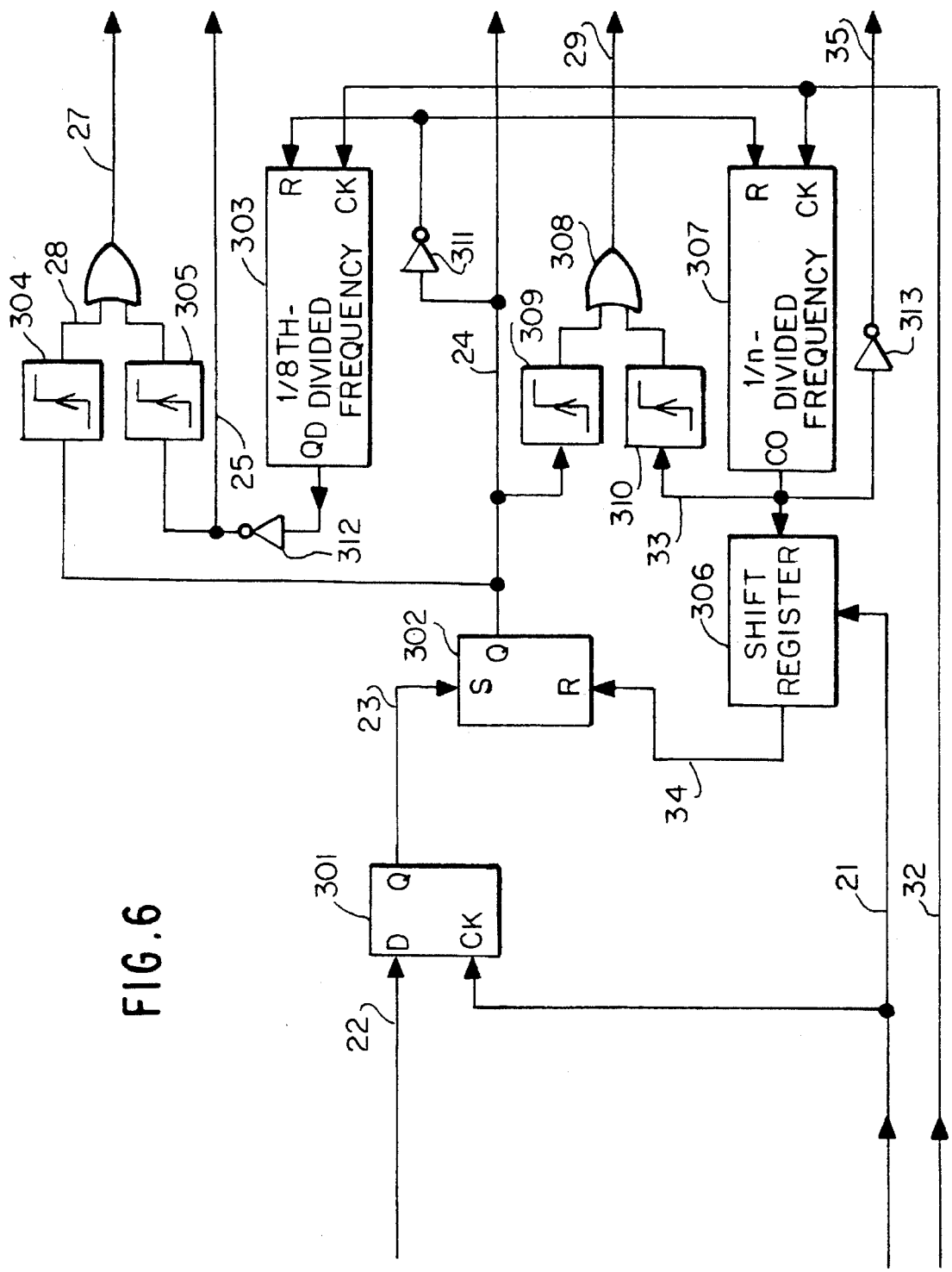
FIG. 6 is a circuit diagram of the voice frame transmission controller 300 shown in FIG. 3.
Figure 7:
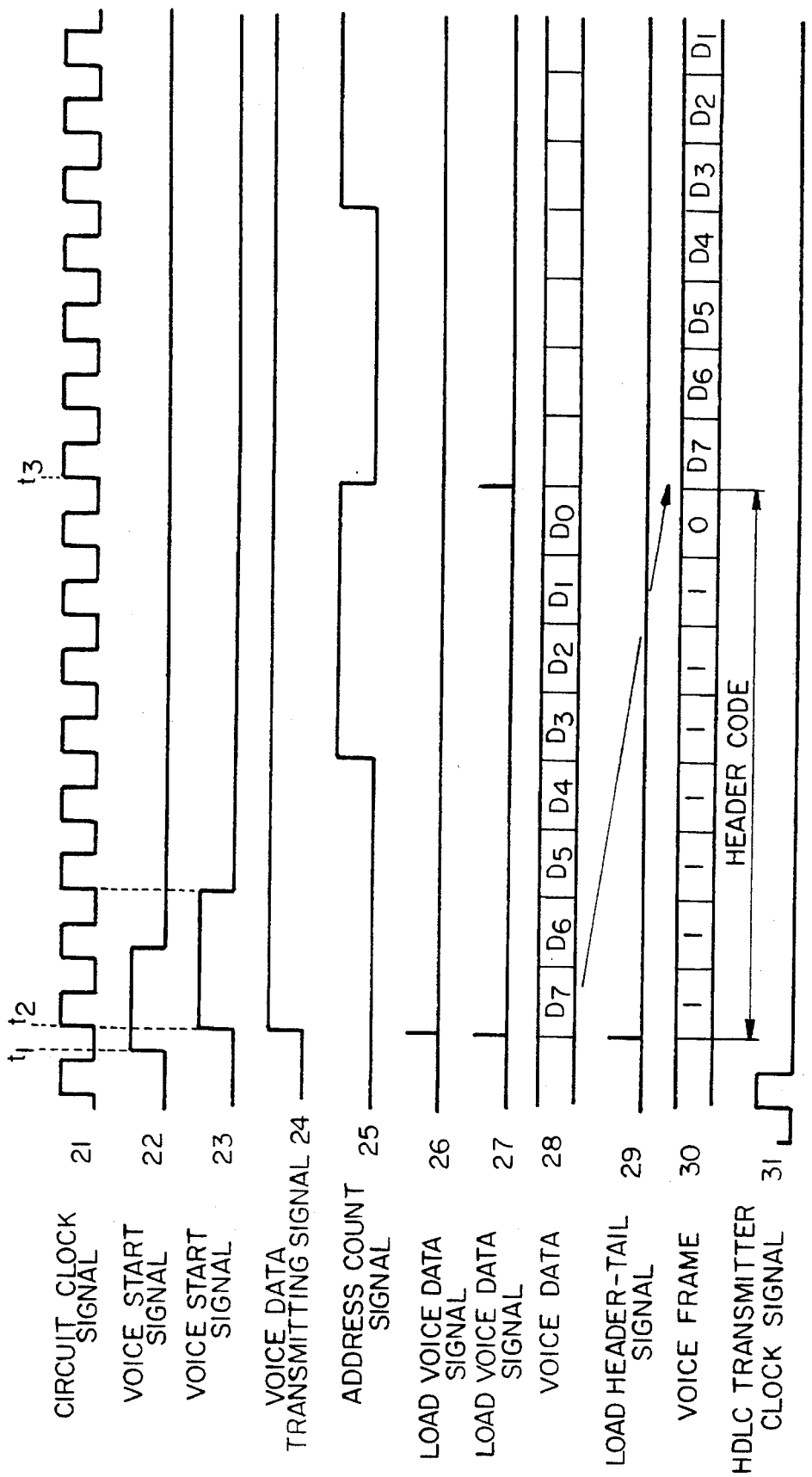
FIG. 7 is a timing chart of the voice frame transmission start time of the circuit shown in FIGS. 5 and 6.
Figure 8:
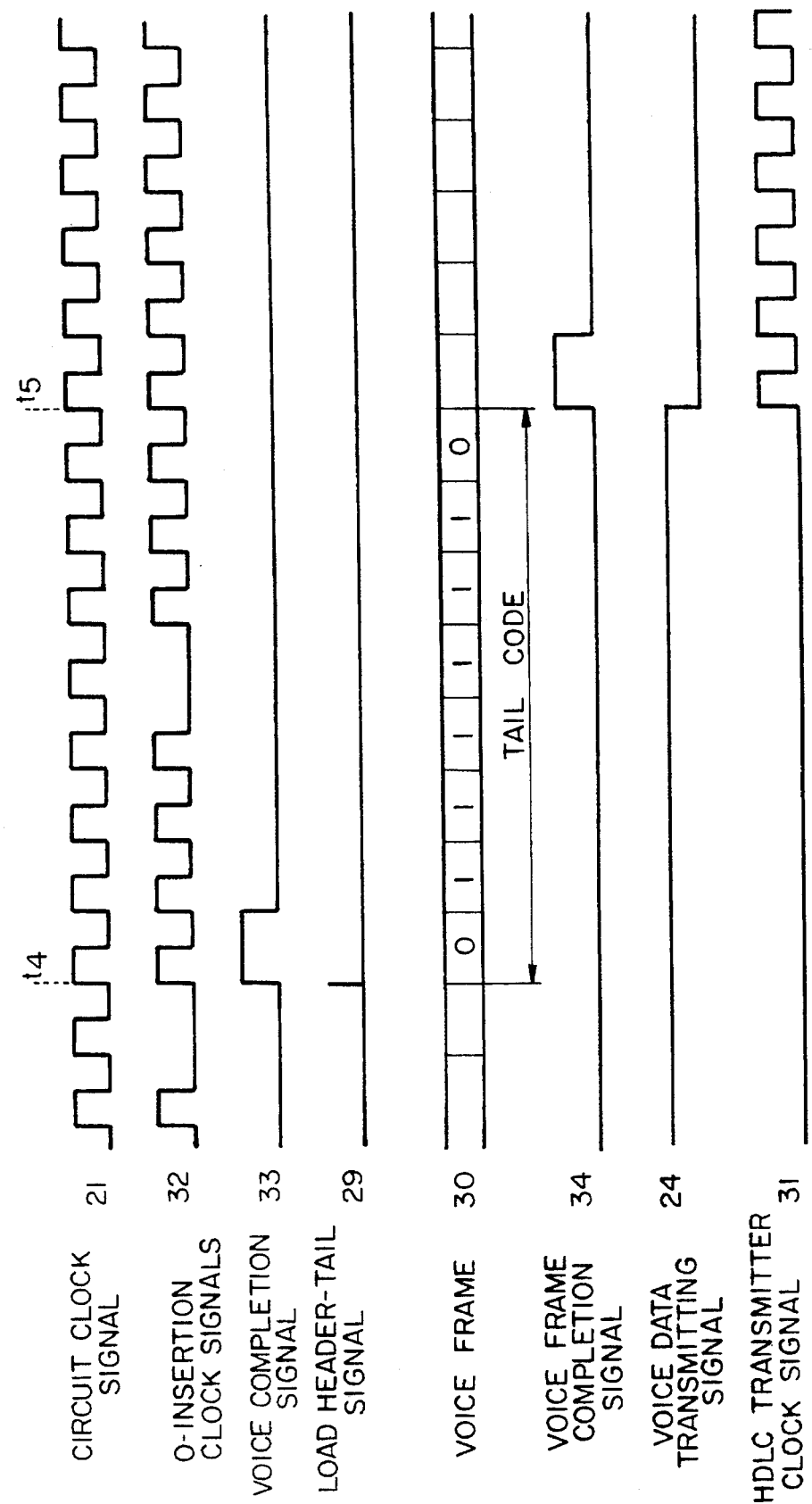
FIG. 8 is a timing chart of the voice frame transmission completion time of the circuit shown in FIGS. 5 and 6.

FIG. 5 is a circuit diagram of voice frame transmitter 200 of FIG. 3, FIG. 6 is a circuit diagram of voice frame transmission controller 300 of FIG. 3, FIG. 7 is a timing chart of voice frame transmission start time, and FIG. 8 is a timing chart of voice frame transmission completion time.

Voice data is stored in advance in byte units in dual-port RAM 201. Address counter 202 counts address count signals 25 and outputs address signals to dual-port RAM 201. Shift register 203 is loaded with the output voice data from dual-port RAM 201 in response to voice data signal 27, is shifted by 0-insertion clock signal 32, and outputs serial-converted voice data 28. 0-insertion circuit 204 inputs voice data 28, inserts one "0" bit after five consecutive "1" bits and outputs data 36. Shift register 205, in response to signal 29, is loaded with header code "11111110" when "header" is indicated by header-tail distinguishing signal 35, and is loaded with tail code "01111110" when "tail" is indicated. Selector 206 selects and outputs HDLC frame 1 from HDLC frame transmitter 100 when transmitting voice data signal 24 is "0", and selects and outputs output 30 of shift register 205 when transmitting voice data signal 24 is "1". Inverter 207 inverts transmitting voice data signal 24. When signal 24 is "1", AND gate 208 stops the HDLC transmitter clock signal 31, which is circuit clock signal 21.

As shown in FIG. 6 Flip-flop 301 is reset by voice start signal 22, and flip-flop 302 is reset by the Q output 23, thereby switching on transmitting voice data signal 24. Differentiation circuits 304, 309 detect the change to "1" of transmitting voice data signal 24, and output load voice data signal 27 and load header-tail signal 29, respectively. Inverter 311 inverts transmitting voice data signal 24. By counting 0-insertion clock signals 32, ⅛th-divided frequency counter 303 counts the number of bits of transmitted voice data and makes its output "1" for every 8 bits counted. This signal is inverted by inverter 312 to both become address counter signal 25 and, when its rise is detected at differentiation circuit 305, become load voice data signal 27. Further, ⅛th-divided frequency counter 303 is reset when transmitting voice data signal 24 is "0". By counting 0-insertion clock signals 32, 1/nth-divided frequency 307 counts the signal length of voice data and generates voice completion signal 33 upon completing a count. This voice completion signal 33 is inverted by inverter 313 to become header-tail distinguishing signal 35. Differentiation circuit 310 detects the rise of voice completion signal 33 and outputs load header-tail signal 29 by way of OR circuit 308. In response to circuit clock signal 21, shift register 306 shifts the carry-over output of 1/nth-divided frequency 307 eight bits, outputs voice frame completion signal 34, and resets flip-flop 302.

Next, the operation during voice frame transmission will be explained with reference to the timing charts shown in FIGS. 7 and 8.

When voice start signal 22 rises at time $t_1$, voice start signal 22 is synchronized to circuit clock signal 21 by flip-flop 301 and sets signal 23 input to flip-flop 302 at $t_2$, and at time $t_2$, transmitting voice data signal 24 becomes "1". The change of transmitting voice data signal 24 to "1" is detected by differentiation circuit 309, a load header-tail signal 29 is produced, and header code "11111110" is loaded to shift register 205. In addition, as a result of the change of transmitting voice data signal 24 to "1", selector 206 is switched, HDLC frame 1 from HDLC frame transmitter 100 is interrupted, selector 206 is connected to shift register 205 on the voice data side and, by the inversion of transmitting voice data signal 24 by inverter 207, HDLC transmitter clock signal 31 is halted by AND gate 208. Further, as a result of the change of transmitting voice data signal 24 to "1", differentiation circuit 304 detects the change of transmitting voice data signal 24 at time $t_2$, load voice data signal 27 is produced, and the first byte of dual-port RAM 201 is loaded to shift register 203.

By the shifting of data by shift register 205 in response to circuit clock signal 21, header code H, followed by serial-converted voice data 28, are transmitted as voice frame 30. By the passage of serial-converted voice data 28 through 0-insertion circuit 204, one "0" bit is inserted after five consecutive "1" bits. Since voice data are stored to dual-port RAM 201 in units of bytes, the number of bits of transmitted voice data is counted by 1/8-divided frequency counter 303, and for every eight bits of voice data transmitted, an address count signal 25 is sent to address counter 202, address counter 202 is updated and, in accordance with load voice data signal 27 passing through differentiation circuit 305, data of dual-port RAM 201 are loaded to shift register 203 in one-byte units. At time $t_3$ in the timing chart of FIG. 7, address count signal 25 is outputted and load voice data signal 27 is outputted.

The signal length of voice data is counted by 1/nth-divided frequency counter 307, and when counted, a voice completion signal 33 is generated at time $t_4$, a load header-tail signal 29 is produced by differentiation circuit 310, and tail code "01111110" is loaded to shift register 205. The codes loaded to shift register 205 are either header code "11111110" or tail code "01111110", but because these two codes differ by only one MSB, the header-tail distinguishing signal 35 is made "0" when voice completion code 33 is outputted, this MSB is made "0" and the tail code is loaded to shift register 205. After the tail code is loaded to shift register 205, the passage of 8 bits of time, i.e., the fact that tail code has been sent, is detected at time $t_5$ by circuit clock signals 21. At this time $t_5$, flip-flop 302 is reset by voice frame completion signal 34, and transmitting voice data signal 24 becomes "0". By the change of the transmitting voice data signal 24 to "0", selector 206 is switched back and HDLC frame 1 of HDLC frame transmitter 100 is outputted to the transmission frame, and in addition, the supply of clock signal 31 to HDLC frame transmitter 100 is resumed.

The foregoing description relates to operation when a voice frame 3 is interposed within an HDLC frame 1 and transmitted.

Figure 9:
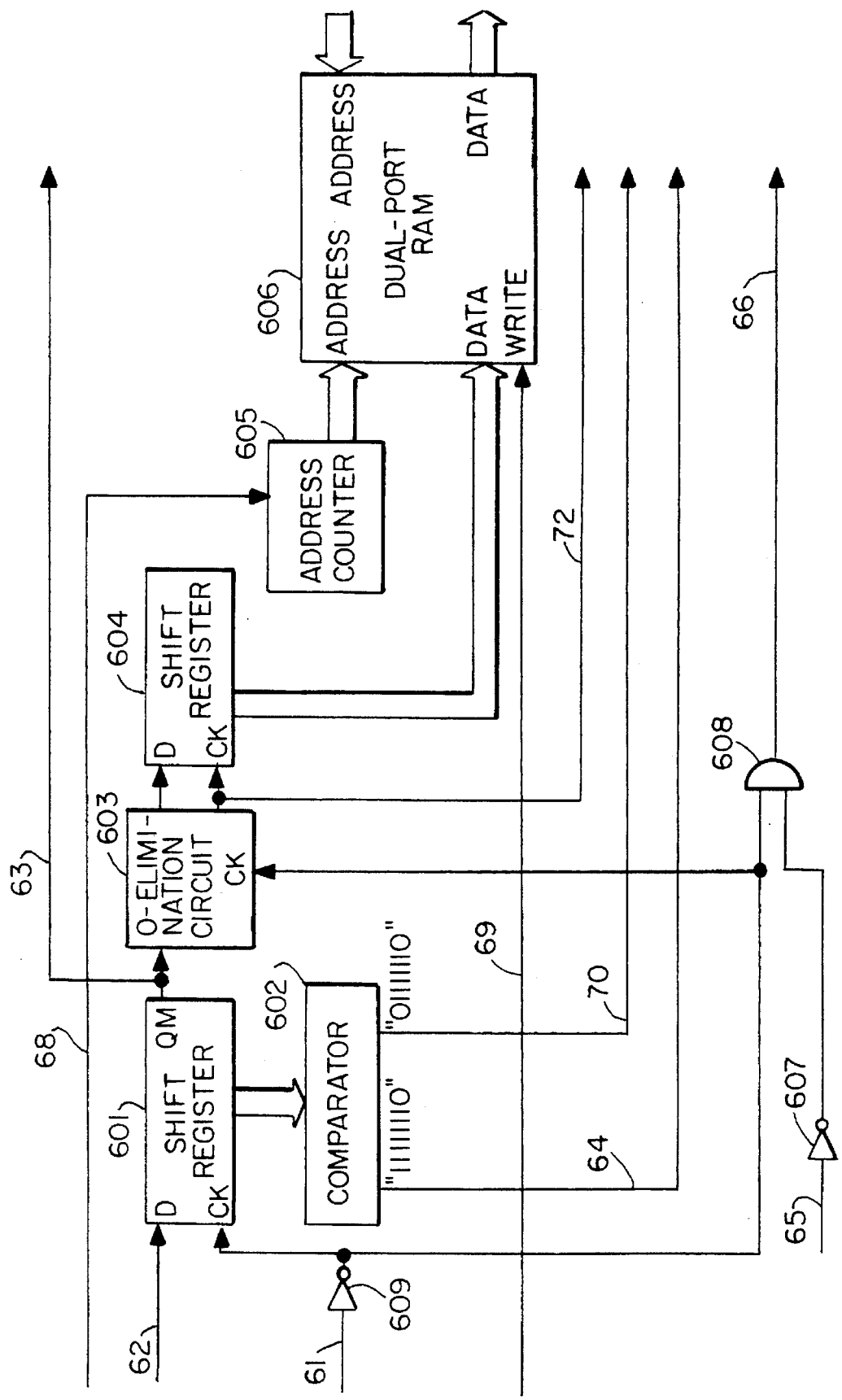
FIG. 9 is a circuit diagram of the voice frame receiver 600 shown in FIG. 3.
Figure 10:
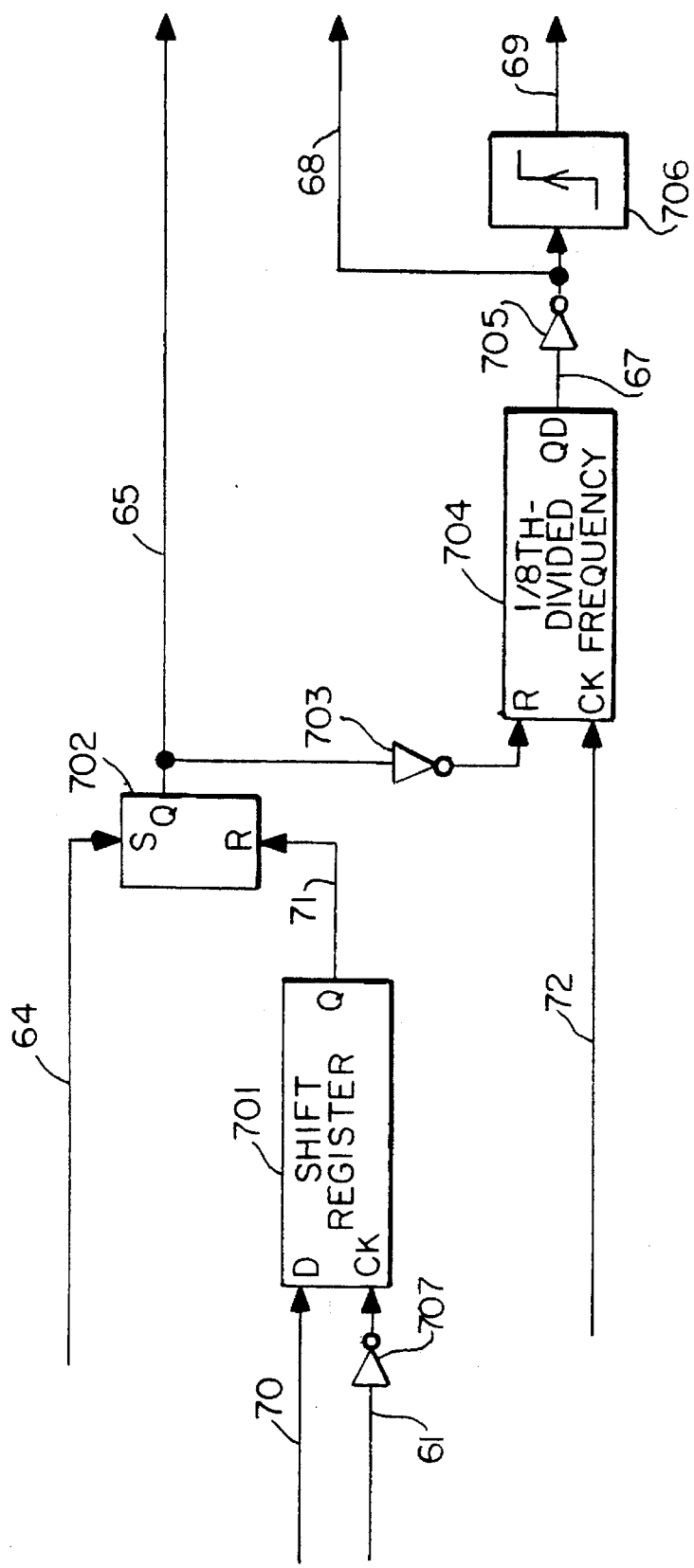
FIG. 10 is a circuit diagram of the voice frame reception controller 700 shown in FIG. 9.
Figure 11:
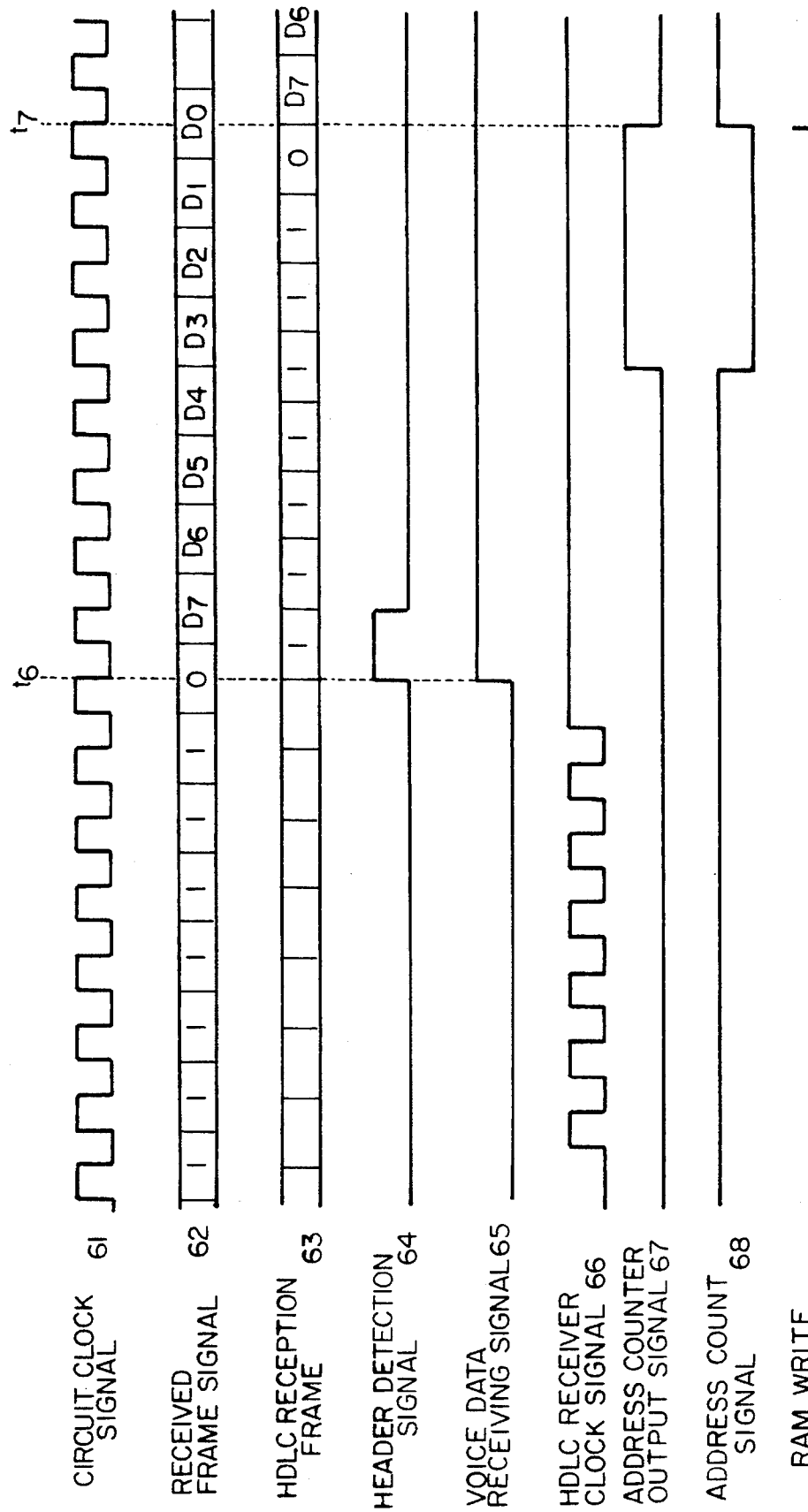
FIG. 11 is a timing chart of the voice frame reception start time of the circuit shown in FIGS. 9 and 10.
Figure 12:
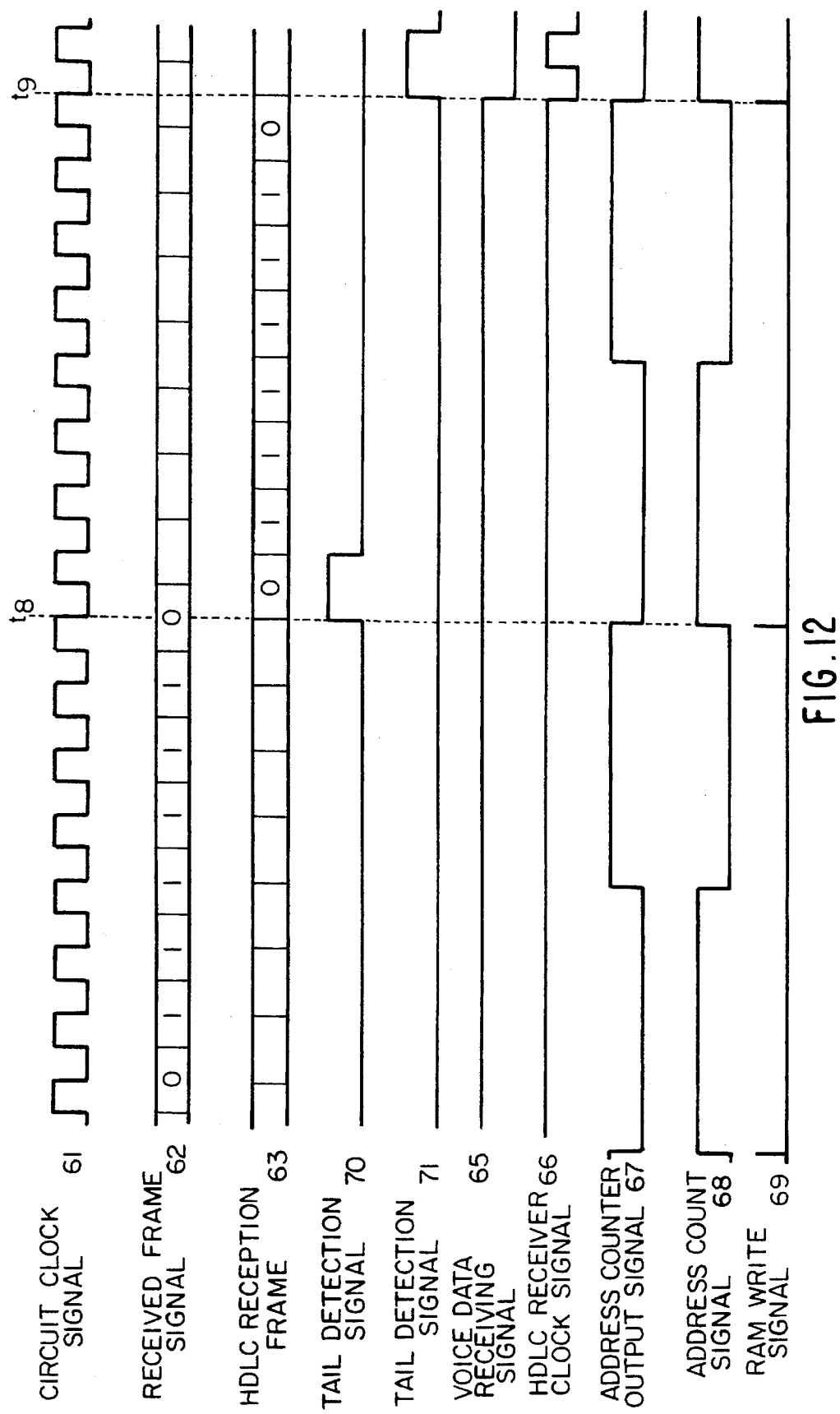
FIG. 12 is a timing chart of the voice frame reception completion time of the circuit shown in FIGS. 9 and 10.

FIG. 9 shows a circuit diagram of voice frame receiver 600 of FIG. 3, FIG. 10 shows a circuit diagram of voice frame reception controller 700 of FIG. 3, FIG. 11 shows a timing chart of voice frame reception starting time, and FIG. 12 shows a timing chart of voice frame reception completion time.

Shift register 601 takes in the received reception frame signal 62 according to circuit clock signal 61. Comparator 602 compares the parallel output of shift register 601 with header code "11111110" and tail code "01111110" and makes header detection signal 64 to "1". if it matches the header code, and makes tail detection signal 70 to "1" if it matches the tail code. Inverter 609 inverts circuit clock signal 61. Inverter 607 inverts receiving voice data signal 65. AND gate 608 inputs the inverted signal of circuit clock signal 61 and the inverted signal of receiving voice data signal 65 and, when receiving voice data signal 65 becomes "0", outputs inverted circuit clock signal 61 as HDLC receiver clock signal 66. 0-elimination circuit 603 eliminates one "0" bit following five consecutive "1" bits within the output 63 of shift register 601, and both outputs 0-eliminated clock signal 72 and outputs the 0-eliminated code to shift register 604. Shift register 604 converts the 0-eliminated output of shift register 601 to 8-bit parallel data. The 8-bit parallel data of shift register 604 is written to dual-port RAM 606 according to RAM write signal 69. Address counter 605 counts address count signals 68 and generates addresses of dual-port RAM 606.

As shown in FIG. 10 Flip-flop 702 is set by header detection signal 64 and outputs receiving voice data signal 65. Inverter 703 inverts receiving voice data signal 65. 1/8th-divided frequency counter 704 is released from reset by the change of the output of inverter 703 to "0", counts 0-eliminated clock signals 72, and outputs counter output signal 67 for every eight bits of voice data taken in. Inverter 705 inverts counter output signal 67, and outputs an address count signal 68 of "1". Differentiation circuit 706 detects the rise of address count signal 68 and outputs RAM write signal 69. Inverter 707 inverts circuit clock signal 61. Shift register 701, in accordance with the inverted signal of circuit clock signal 61, shifts tail detection signal 70 eight bits, outputs the signal as tail detection code 71, and resets flip-flop 702.

The voice frame receiving operation will next be explained with reference to the timing charts shown in FIGS. 11 and 12.

Figure 1:
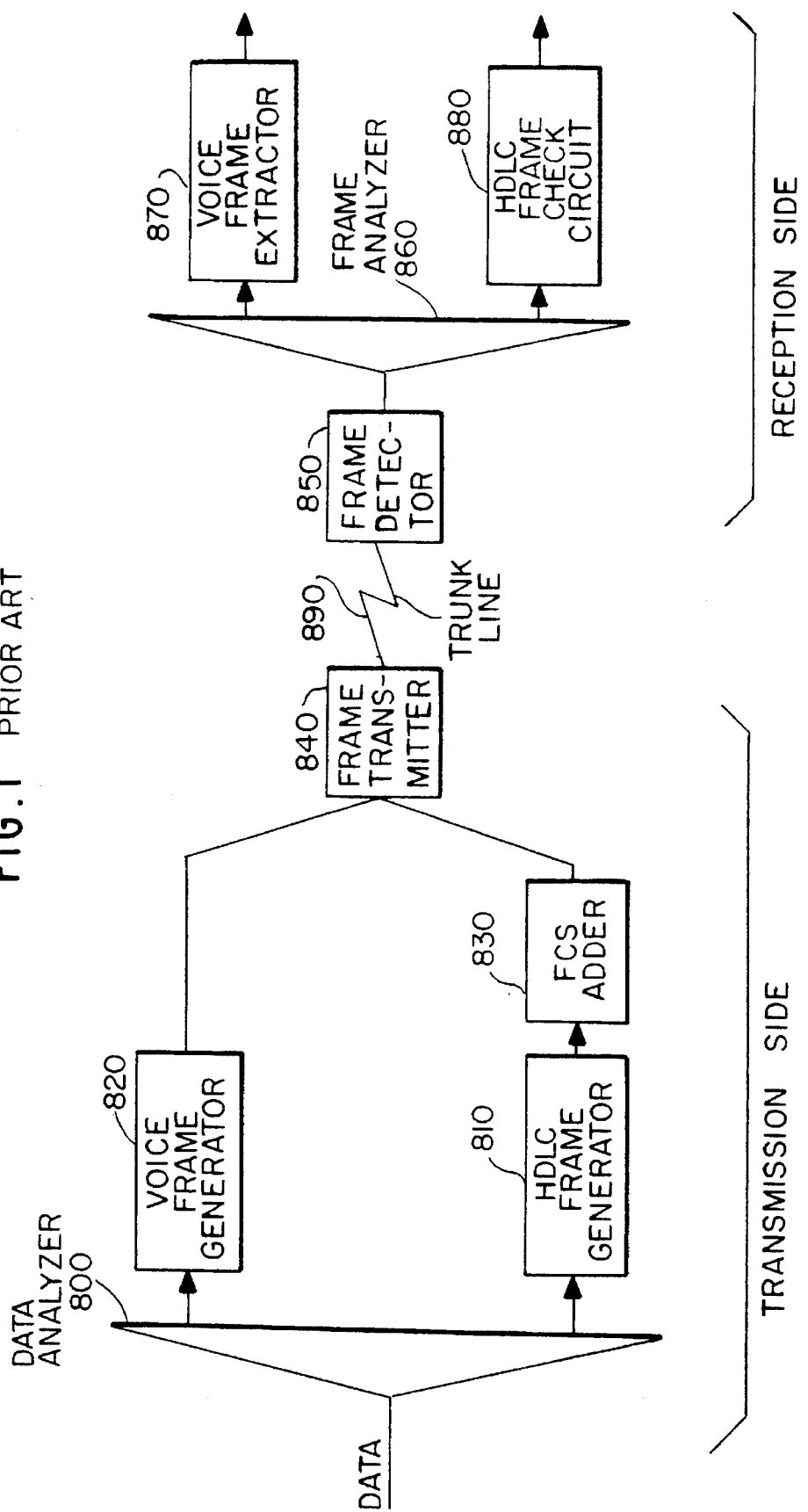
FIG. 1 is a view showing the construction of a conventional data communications apparatus.

Received reception frame signal 62 is taken in shift register 601 according to circuit clock signal 61. The parallel output of shift register 601, is inputted in comparator 602, and when header code "11111110" is detected at time $t_6$, header detection signal 64 becomes "1". Flip-flop 702 is set by header detection signal 64 and receiving voice data signal 65 becomes "1". Clock signal 66 to HDLC frame receiver 500 is halted by AND gate 608 through the change of receiving voice data signal 65 to "1", and voice frame 3 is not taken in at HDLC frame receiver 500. Further, by the release of the reset of 1/8th-divided frequency counter 704, 1/8th-divided frequency counter 704 commences counting and sends out a counter output signal 67 for every eight bits of voice data taken in, whereby address counter 605, which indicates the address in dual-port RAM 606, is updated by address count signal 68, and further, RAM write signal 69 for dual-port RAM 606 is produced by differentiation circuit 706. In FIG. 1, counter output signal 67 is outputted at time $t_7$, and address count signal 68 and RAM write signal 69 are outputted. The received voice data passes through shift register 601, 0-elimination circuit 603, and shift register 604, is converted to 8-bit parallel data, and is written to dual-port RAM 606 in byte units. When tail code "01111110" is detected at time $t_8$ by comparator 602, tail detection signal 70 is outputted and inputted to shift register 701. Because shift register 701 delays the time for eight bits according to circuit clock signal 61, flip-flop 702 is reset by tail detection signal 71 at time $t_9$, and receiving voice data signal 65 is becomes "0". 1/8th-divided frequency counter 704 is reset by the change of receiving voice data signal 65 to "0", whereby RAM write signal 69 is not outputted and AND gate 608 is opened allowing resumption of supply of clock signal 66 to HDLC frame receiver 500. By delaying frames received at HDLC frame receiver 500 by 8 bits according to circuit clock signal 61 through shift register 601, the header code is prevented from being taken in the HDLC frame receiver 500 during the detection time of the header code.

Figure 13:
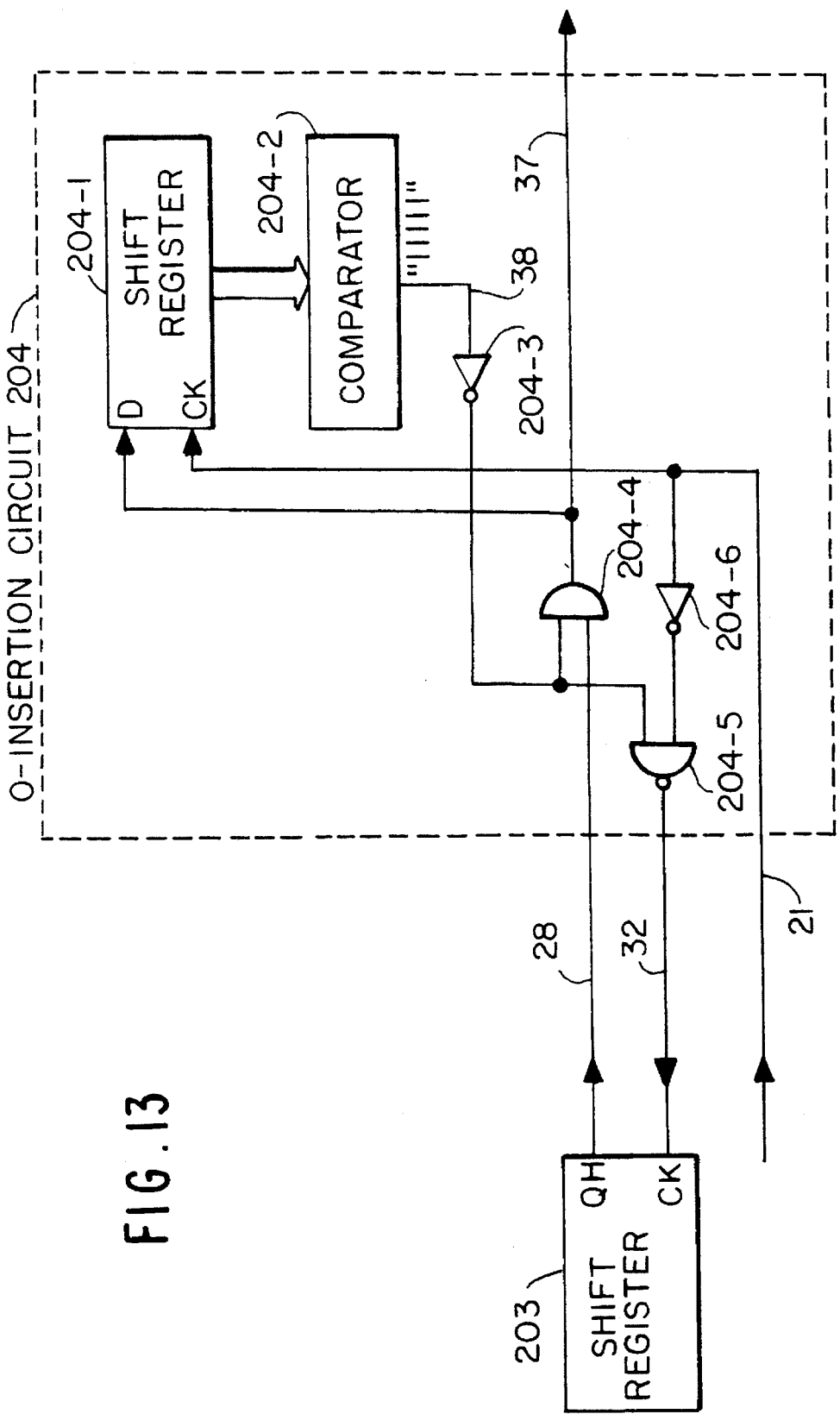
FIG. 13 is a circuit diagram of the 0-insertion circuit 204 shown in FIG. 5.
Figure 14:
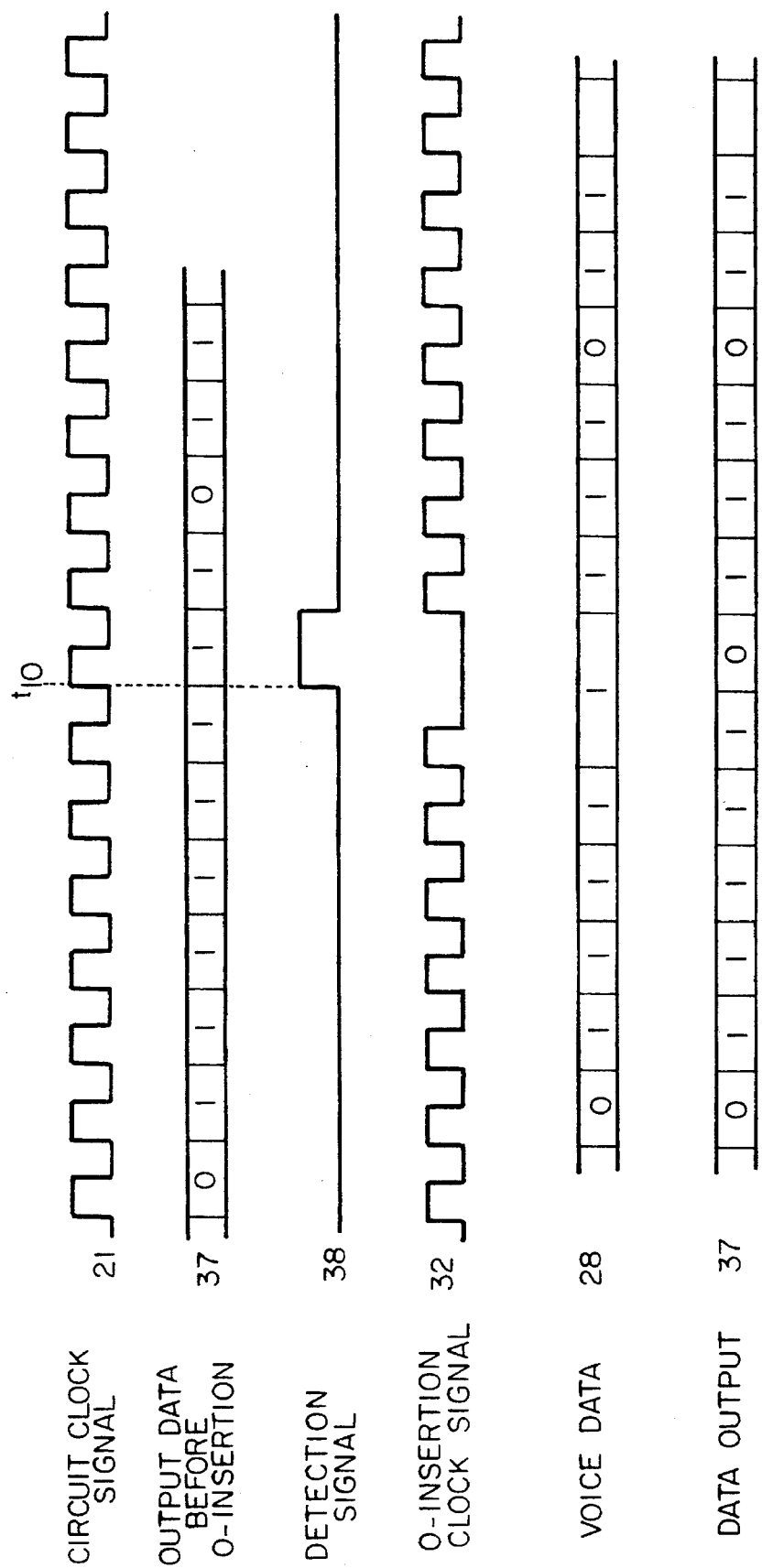
FIG. 14 is a timing chart of the 0-insertion circuit 204 shown in FIG. 13.

FIG. 13 is a circuit diagram of the 0-insertion circuit of FIG. 5, the operation of which is shown by the timing chart of FIG. 14.

0-insertion circuit 204 consists of shift register 204-1, which serially inputs, according to circuit clock signal 21, voice data 28, which is the output data of shift register 203, and parallel-converts the data in 5-bit portions; comparator 204-2, which compares the parallel output of shift register 204-1 with the code "11111" and outputs detection signal 38 when the output and code match; inverter 204-3, which inverts detection signal 38; AND gate 204-4 which, until detection signal 38 is outputted from comparator 204-2, passes voice data 28 outputted from shift register 203 and outputs the data to shift register 204-1, and further, outputs the data as data output 37; inverter 204-6, which inverts circuit clock signal 21; and NAND gate 204-5, which inputs the output of inverter 204-3 and the output of inverter 204-6 and outputs 0-insertion clock signal 32 to shift register 203.

The output data of shift register 203 is parallel-converted in 5-bit portions by shift register 204-1. Detection signal 38 is outputted when the code "11111" is detected at a time $t_{10}$ by comparator 204-2. By both forcing data output 37 to only one "0" bit by this signal 38 and, by the close of NAND gate 204-5, thereby halting for one bit the clock 32 for shifting shift register 203 of the previous stage, one "0" bit can be inserted into the passed serial data.

Figure 15:
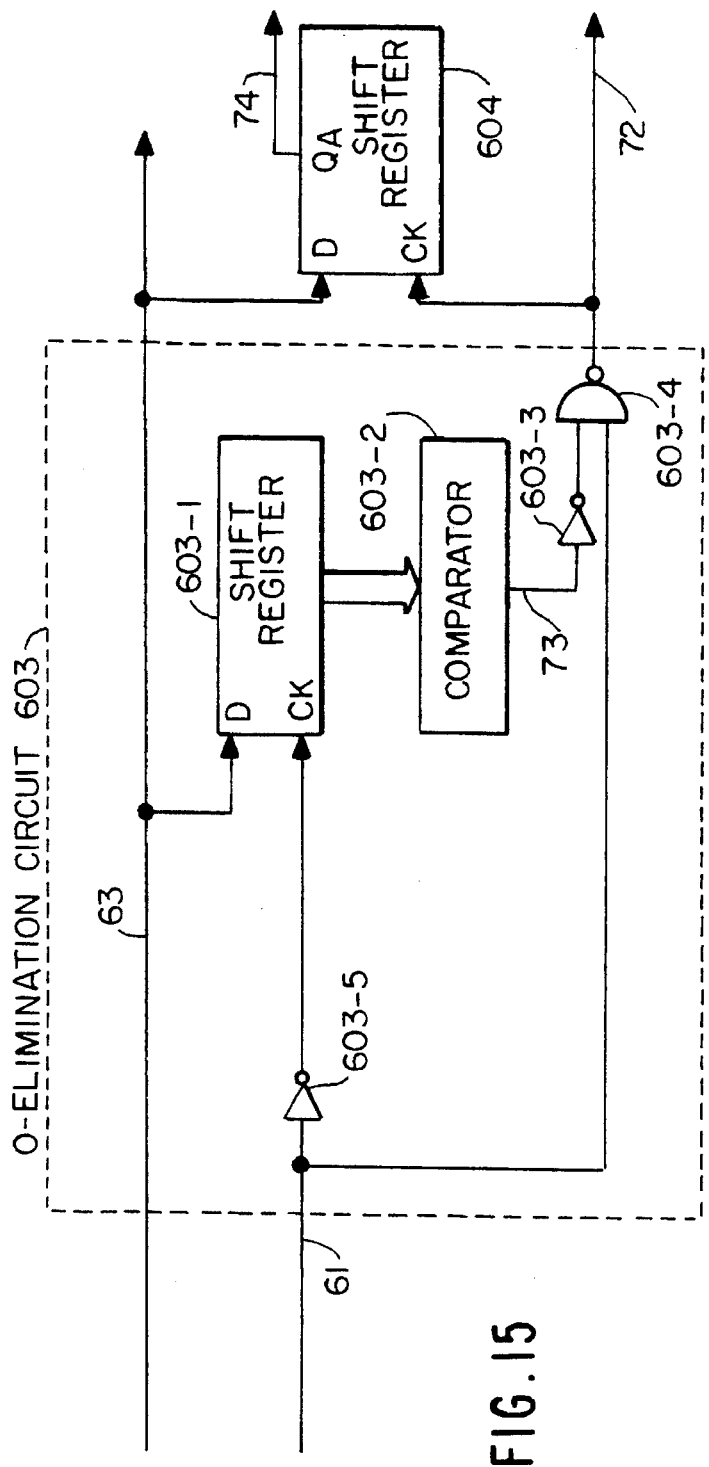
FIG. 15 is a circuit diagram of the 0-elimination circuit 603 shown in FIG. 9.

FIG. 15 is a circuit diagram of the 0-elimination circuit 603 shown in FIG. 9, the operation of which is shown by the timing chart of FIG. 16.

0-elimination circuit 603 consists of inverter 603-5, which inverts circuit clock signal 61; shift register 603, which takes in HDLC reception frame 63, which is the output of shift register 601, and parallel-converts and outputs the result in 5-bit portions; comparator circuit 603-2, which compares the parallel output of shift register 603-1 with code "11111" and makes detection signal 73 "1" when the output and code match; inverter 603-3, which inverts detection signal 73; and NAND gate 603-4, which inputs circuit clock signal 61 and the output of inverter 603-3, and fixes 0-elimination clock signal 72 to "1" when detection signal 73 is "1".

After serial data outputted from shift register 601 is taken into shift register 603-1, 5-bit portions are parallel-converted and outputted to comparator 603-2. When the code "11111" is detected by comparator 603-2 at time $t_{11}$, detection signal 73 becomes "1". By this signal 73, NAND gate 603-4 is closed and the shift clock of shift register 603 is halted one bit, whereby the one "0" bit is not taken in at shift register 604 following code "11111", thereby enabling 0 elimination.

An ordinary data communications apparatus is provided with a transmission part and a reception part. If the transmission part and reception part are controlled by one processor, dual-port RAM 201 of voice frame transmitter 200 and dual-port RAM 606 of voice frame receiver 600 used in the embodiment of the present invention one can be combined into one RAM having a processor port, voice frame transmitter port, and voice frame receiver port. In this case, the processor can be interrupted to carry out reception procedure when the receiving voice frame signal changes from "1" to "0".

Figure 17A:
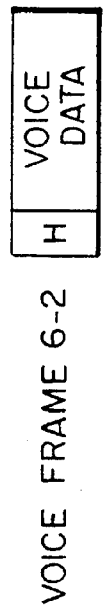
FIGS. 17A and 17B are views showing the structures of another voice frames.
Figure 17B:
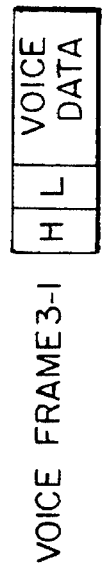

FIGS. 17A and 17B shows another example of a voice frame.

The header code H occurring in voice frame 3-1 (FIG. 17A) is "11111110", an exception to the HDLC pattern. After the header code, a signal length L is added which indicates the voice data length by number of bytes. When header code H is detected on the reception side, the receiving voice frame signal 5 becomes "1", following which signal length L is read and set at the counter. The counter is subjected to subtraction for every eight bits of voice data received, and when the counter value reaches 0, receiving voice frame signal 5 is becomes "0" and the reception of voice frame 3-1 is completed. In this example, there is no necessity for 0-insertion to or 0-elimination from the voice data. Voice frame 3-2 (FIG. 17B) is for a case in which the voice data length is fixed, thereby making signal length L in the voice frame 3-1 unnecessary.

While a preferred embodiment of the present invention has been described using specific terms, such description is for illustration only, and it is to be understood that changes and variations may be made without departing from the spirit or scope of the following claims.

What is claimed is:

1. A data communications method whereby HDLC data and voice data are transmitted and received, comprising the steps of:

inserting voice data between a header code and tail code that do not occur in ordinary HDLC data;

interposing a frame including said voice data and header and tail codes into an ordinary HDLC frame;

transmitting both frames as a composite frame;

extracting data inserted between said header code and said tail code as voice data;

and stopping transmitting side and receiving side clocks of HDLC data during transmission of said voice data.

2. A data communications method whereby HDLC data and voice data are transmitted and received comprising the steps of:

adding a header code that does not occur in ordinary HDLC data and a signal indicating length of said voice data before said voice data;

interposing a frame including said voice data, said header code and said voice data length signal into an ordinary HDLC frame;

transmitting both frames as a composite frame;

extracting data of said voice data length following said header code and said voice data length signal and stopping transmitting side and receiving side clocks of HDLC data during transmission of said voice data.

3. A data communications method whereby HDLC data and voice data of fixed length are transmitted and received, comprising the steps:

adding a header code that does not occur in ordinary HDLC data before voice data;

interposing a frame including the said header code and said voice data into an ordinary HDLC frame;

transmitting both frames as a composite frame;

extracting said data of fixed length following said header code as voice data;

and stopping transmitting side and receiving side clocks of HDLC data during transmission of said voice data.

4. A data communications method according to any of claims 1 to 3 wherein said header code is "11111110".

5. A data communications method according to claim 1 wherein said tail code is "01111110".

6. A data communications apparatus for transmitting and receiving ordinary HDLC data and voice data, comprising on the transmitting side:

means for converting voice data to serial voice data;

means for adding a header code that does not occur in ordinary HDLC data before said serial voice data and adding a tail code after said serial voice data;

means for transmitting while switching between ordinary HDLC data and serial voice data to which header code and tail code are added; and means for stopping ordinary HDLC data transmission during transmission of voice data;

and comprising on the receiving side:

means for detecting said header code and said tail code;

means for taking in data inserted between said header code and said tail code as serial voice data; and means for stopping data reception from the start of detection of said header code until completion of detection of said tail code.

7. A data communications apparatus for transmitting and receiving ordinary HDLC data and voice data, comprising on the transmitting side:

means for converting voice data to serial voice data;

means for adding before said serial voice data a header code that does not occur in ordinary HDLC data and a signal indicating the data length of said serial voice data;

means for transmitting while switching between ordinary HDLC data and serial voice data to which header code and data length signal have been added; and means for stopping ordinary HDLC data transmission during transmission of serial voice data;

and comprising on the receiving side:

means for detecting said header code and said data length signal;

means for taking in as voice data, data of said data length, following said data length signal; and means for stopping ordinary HDLC data reception from the start of detection of said header code until completion of taking in of serial voice data.

8. A data communications apparatus for transmitting and receiving ordinary HDLC data and voice data of fixed length, comprising on the transmitting side:

means for converting voice data to serial voice data;

means for adding before said serial voice data a header code that does not occur in ordinary HDLC data;

means for transmitting while switching between ordinary HDLC data and serial voice data to which header code has been added; and means for stopping ordinary HDLC data transmission during transmission of serial voice data;

and comprising on the receiving side:

means for detecting said header code;

means for taking in data of fixed data length, following said header code as serial voice data; and means for stopping ordinary HDLC data reception from the start of detection of said header code until completion of taking in of said serial voice data.

* * * * *